United States Patent
Zywiak

(10) Patent No.: US 9,988,153 B2
(45) Date of Patent: Jun. 5, 2018

(54) RAF BIT FOR SURGE DETECTION

(71) Applicant: HAMILTON SUNDSTRAND CORPORATION, Windsor Locks, CT (US)

(72) Inventor: Peter Zywiak, Middletown, CT (US)

(73) Assignee: HAMILTON SUNDSTRAND SPACE SYSTEMS, Windsor Locks, CT (US)

( * ) Notice: Subject to any disclaimer, the term of this patent is extended or adjusted under 35 U.S.C. 154(b) by 328 days.

(21) Appl. No.: 14/797,850

(22) Filed: Jul. 13, 2015

(65) Prior Publication Data

US 2017/0015426 A1   Jan. 19, 2017

(51) Int. Cl.
| | |
|---|---|
| *F04D 27/02* | (2006.01) |
| *B64D 13/08* | (2006.01) |
| *F04D 19/00* | (2006.01) |
| *F04D 25/06* | (2006.01) |
| *F04D 27/00* | (2006.01) |

(52) U.S. Cl.
CPC .......... *B64D 13/08* (2013.01); *F04D 19/002* (2013.01); *F04D 25/06* (2013.01); *F04D 27/001* (2013.01); *F04D 27/0261* (2013.01); *F05D 2270/3013* (2013.01)

(58) Field of Classification Search
CPC .... F04D 27/0261; F04D 27/02; F04D 49/065; F04D 19/002; F04D 25/06
See application file for complete search history.

(56) References Cited

U.S. PATENT DOCUMENTS

| | | | | |
|---|---|---|---|---|
| 3,868,625 | A * | 2/1975 | Speigner | F04D 27/001 340/626 |
| 5,038,893 | A * | 8/1991 | Willner | F16N 29/00 184/39.1 |
| 5,306,116 | A * | 4/1994 | Gunn | F04D 27/02 415/17 |
| 6,124,646 | A * | 9/2000 | Artinian | B64D 13/06 290/52 |
| 8,262,018 | B2 | 9/2012 | Scherer et al. | |
| 8,360,358 | B2 | 1/2013 | Klimpel | |
| 2006/0059941 | A1* | 3/2006 | Merritt | B64D 13/06 62/401 |
| 2006/0067833 | A1* | 3/2006 | McAuliffe | B64D 13/02 417/43 |

(Continued)

FOREIGN PATENT DOCUMENTS

| | | |
|---|---|---|
| EP | 2792960 A1 | 10/2014 |
| WO | 1997038270 A1 | 10/1997 |

OTHER PUBLICATIONS

EP SR, dated Nov. 15, 2016, U310618EP, EP Patent Application No. EP 16179311, 7 pages.

*Primary Examiner* — Charles Freay
*Assistant Examiner* — Thomas Fink
(74) *Attorney, Agent, or Firm* — Cantor Colburn LLP

(57) ABSTRACT

A ram air fan (RAF) assembly is provided and includes a ram air inlet, a heat exchanger disposed in the ram air inlet, an RAF disposed in the ram air inlet to drive airflow through the heat exchanger, a sensor disposed in the ram air inlet proximate to the RAF and a controller. The controller is operably coupled to the RAF and the sensor and is configured to drive rotations of the RAF to achieve a target RAF rotational speed in accordance with a determination that a reading generated by the sensor is indicative of a surge event.

20 Claims, 3 Drawing Sheets

(56) References Cited

U.S. PATENT DOCUMENTS

| | | | |
|---|---|---|---|
| 2008/0161974 A1* | 7/2008 | Alston | F04B 35/00 700/276 |
| 2012/0060532 A1* | 3/2012 | Shimoda | F24F 1/0003 62/150 |
| 2013/0291651 A1 | 11/2013 | Kelnhofer et al. | |
| 2014/0305610 A1 | 10/2014 | Zywiak | |
| 2015/0166186 A1 | 6/2015 | Zywiak et al. | |

* cited by examiner

RAF BIT FOR SURGE DETECTION

BACKGROUND OF THE DISCLOSURE

The subject matter disclosed herein relates to a ram air fan and, more particularly, to a ram air fan for surge bit detection.

An environmental control system (ECS) of an aircraft provides air supply, thermal control and cabin pressurization for the crew and passengers. Avionics cooling, smoke detection and fire suppression are also commonly considered part of an aircraft's environmental control system. At least a portion of the air supply for the ECS of a given aircraft is generated by the ram air inlet and the ram air fan (RAF). The ram air inlet is generally a small scoop located on a wing-to-body fairing and may include a modulating door to control an amount of cooling airflow through primary and secondary ram air heat exchangers as well as modulating vanes on ram air exhaust to increase ram air recovery. The RAF provides for ram air flow across the heat exchangers.

During operation, ram air is drawn through the heat exchangers by the RAF. However, it has been seen that contamination from ambient air flows will increase the pressure drop of the heat exchangers and may thereby reduce flow through the RAF and the heat exchangers. Indeed, significant heat exchanger contamination can reduce the airflow to the extent that the RAF can operate in an unstable operating mode (i.e., stall), which can cause excessive blade stress that may result in a failure of the RAF.

BRIEF DESCRIPTION OF THE DISCLOSURE

According to one aspect of the disclosure, a ram air fan (RAF) assembly is provided and includes a ram air inlet, a heat exchanger disposed in the ram air inlet, an RAF disposed in the ram air inlet to drive airflow through the heat exchanger, a sensor disposed in the ram air inlet proximate to the RAF and a controller. The controller is operably coupled to the RAF and the sensor and is configured to drive rotations of the RAF to achieve a target RAF rotational speed in accordance with a determination that a reading generated by the sensor is indicative of a surge event.

In accordance with additional or alternative embodiments, the heat exchanger includes a primary heat exchanger and a secondary heat exchanger in series.

In accordance with additional or alternative embodiments, the RAF is downstream from the heat exchanger.

In accordance with additional or alternative embodiments, the sensor is downstream from the RAF.

In accordance with additional or alternative embodiments, the sensor includes a pressure sensor.

In accordance with additional or alternative embodiments, the controller includes an electric motor configured to drive the rotations of the RAF, a motor controller configured to control an operation of the electric motor and a pack controller configured to determine a current RAF rotational speed, to register that the reading generated by the sensor is indicative of a surge event and to instruct the motor controller to control the operation of the electric motor accordingly.

In accordance with additional or alternative embodiments, the target RAF rotational speed is 7,000 RPM.

In accordance with additional or alternative embodiments, the controller determines that the reading generated by the sensor is indicative of the surge event in an event the reading comprises a predefined number of extra-parameter fluctuations in a predefined time.

In accordance with additional or alternative embodiments, the controller is further configured to issue a warning that the reading generated by the sensor is indicative of the surge event.

According to another aspect of the disclosure, a ram air fan (RAF) assembly of an aircraft is provided and includes a ram air inlet, a heat exchanger disposed in the ram air inlet, an RAF disposed in the ram air inlet to drive airflow through the heat exchanger, a sensor disposed in the ram air inlet proximate to the RAF and a controller. The controller is operably coupled to the RAF and the sensor and is configured to drive rotations of the RAF to achieve a target RAF rotational speed in accordance with a current RAF rotational speed and a reading generated by the sensor.

In accordance with additional or alternative embodiments, the heat exchanger includes a primary heat exchanger and a secondary heat exchanger in series.

In accordance with additional or alternative embodiments, the RAF is downstream from the heat exchanger.

In accordance with additional or alternative embodiments, the sensor is downstream from the RAF.

In accordance with additional or alternative embodiments, the sensor includes a pressure sensor.

In accordance with additional or alternative embodiments, the controller includes an electric motor configured to drive the rotations of the RAF, a motor controller configured to control an operation of the electric motor and a pack controller configured to determine the current RAF rotational speed, to register that the reading generated by the sensor is indicative of a surge event and to instruct the motor controller to control the operation of the electric motor accordingly.

In accordance with additional or alternative embodiments, the target RAF rotational speed is 7,000 RPM.

In accordance with additional or alternative embodiments, the pack controller registers that the reading generated by the sensor is indicative of the surge event in an event the reading comprises a predefined number of extra-parameter fluctuations in a predefined time.

In accordance with additional or alternative embodiments, the pack controller is further configured to issue a warning that the reading generated by the sensor is indicative of the surge event.

According to yet another aspect of the disclosure, a method of managing an operation of a ram air fan (RAF) is provided. The method includes measuring a pressure proximate to the RAF, determining, from the measuring, that the pressure proximate to the RAF exhibits a predefined number of extra-parameter fluctuations in a predefined time, recognizing that a surge event is in effect in an event that the pressure proximate to the RAF exhibits the predefined number of extra-parameter fluctuations in the predefined time and controlling the RAF to rotate at a target RAF rotational speed during the surge event.

In accordance with additional or alternative embodiments, the method further includes issuing a warning that the surge event is in effect.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, a ram air fan (RAF) is provided. The RAF is powered by an electric motor and motor controller and the RAF rotational speed is known by the air conditioning pack controller. With such a configuration, pressure at the RAF is a key parameter in determining an operational status of the RAF and in detecting a surge event. That is, during a "low flow" operation caused by excessive heat exchanger pressure drop, the pressure at the RAF fluctuates as the RAF operates in surge and instrumentation that can accurately measure the pressure at the RAF allows the pack controller to place the RAF at a safe operating speed range (e.g., 7000 rpm) and to send a maintenance message used for inspection of the heat exchangers.

Figure 1:
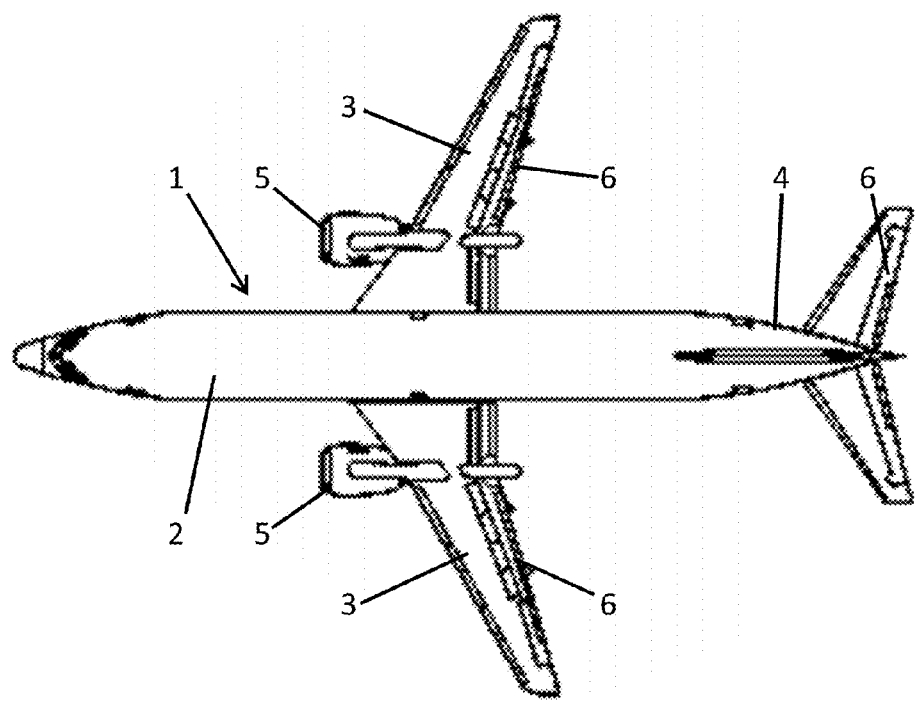
FIG. 1 is a schematic top down view of an aircraft in accordance with embodiments.

With reference to FIG. 1, an aircraft 1 I provided. The aircraft includes a fuselage 2, which has an aerodynamic nose cone and a trailing portion opposite the nose cone, wings 3 extending outwardly from the fuselage 2, a tail portion 4 at the trailing portion of the fuselage 2 and engines 5. The engines 5 are supported within engine nacelles that are either suspended from undersides of the wings 3 or are built into the tail portion 4. The aircraft 1 further includes controllable surfaces 6 at trailing edges of the wings 3 and the tail portion 4. Control of the aircraft 1 is maintained by a pilot and a flight computer that controls operations of the engines 5 and the controllable surfaces in accordance with pilot inputted commands, current flight conditions and mission parameters.

Figure 2:
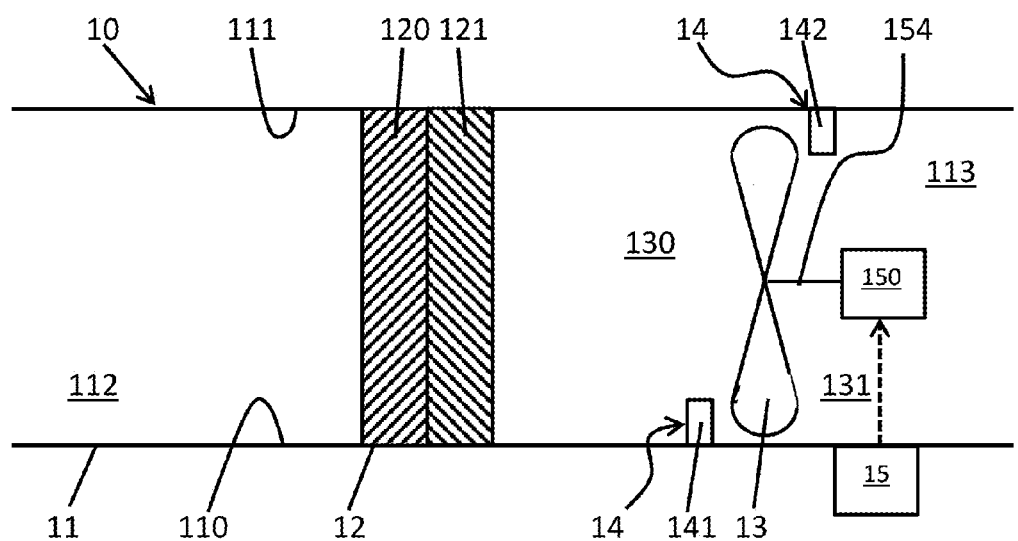
FIG. 2 is a schematic illustration of a ram air fan (RAF) assembly in accordance with embodiments.
Figure 3:
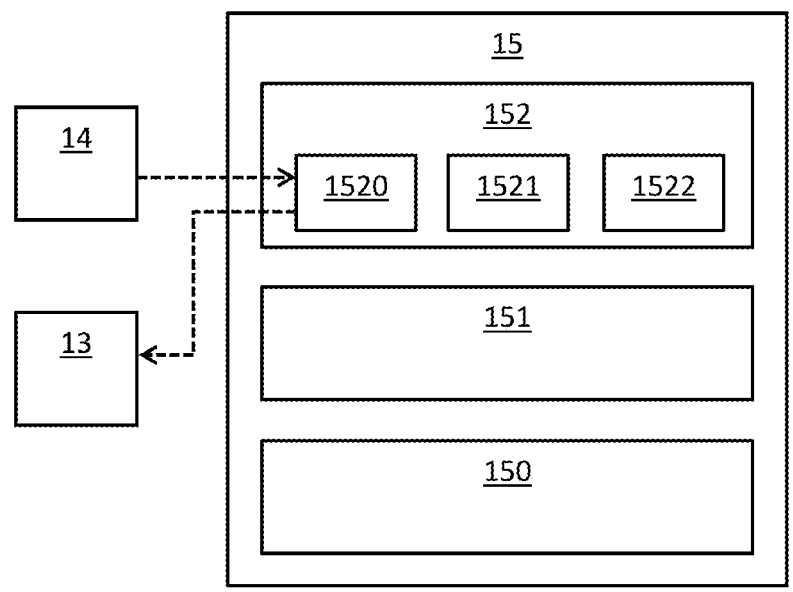
FIG. 3 is a schematic illustration of a pack controller of the RAF assembly of FIG. 2.
Figure 4:
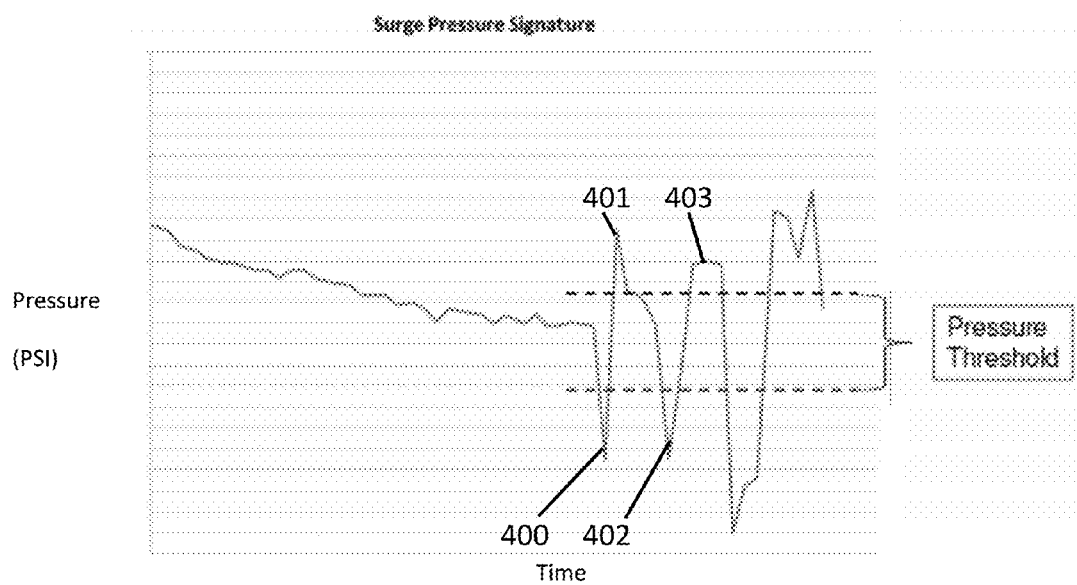
FIG. 4 is a graphical display of readings of a sensor in the RAF assembly of FIG. 2.

With reference to FIGS. 2-4, an RAF assembly 10 is provided for use with the aircraft 1 of FIG. 1 and includes a ram air inlet 11, a heat exchanger 12, an RAF 13, a sensor 14 and a controller 15. The ram air inlet may be disposed, for example, at a fairing between one of the wings 3 and the fuselage 2 and may include at least first and second wall elements 110 and 111. The first and second wall elements 110 and 111 are disposed at a distance from one another to define an inlet opening 112 at a first end of the ram air inlet 11 and an outlet opening 113 at a second end of the ram air inlet 11. In accordance with embodiments, the ram air inlet 11 may be generally straight or curved at one or more locations.

The heat exchanger 12 is disposed in the ram air inlet 11 such that air flow moving through the ram air inlet 11 flows over and through the heat exchanger 12. In accordance with embodiments, the heat exchanger 12 may include a primary heat exchanger 120 and a secondary heat exchanger 121 in series with one another. With this configuration, bleed air may enter the primary heat exchanger 120, where it may be cooled by the air flow moving through the ram air inlet 11 (i.e., the "ram air"). The cooled air then enters a compressor, where it is re-pressurized and heated, and then passes through the secondary heat exchanger 121 to be cooled with maintained pressurization.

The RAF 13 is disposed in the ram air inlet 11 to drive the flow of the ram air over and through the heat exchanger 12. As shown in FIG. 2, the RAF 13 may be disposed downstream from the heat exchanger 12 so as to define a first pressurized region 130 downstream from the heat exchanger 12 and upstream from the RAF 13 and a second pressurized region 131 downstream from both the heat exchanger 12 and the RAF 13. The sensor 14 may be disposed in the ram air inlet 11 and may include a first sensor element 141 within the first pressurized region 130 and at an axial location defined upstream from and proximate to the RAF 13 and a second sensor element 142 within the second pressurized region 131 and at an axial location defined downstream from and proximate to the RAF 13. The first and second sensor elements 141 and 142 may each be provided as a pressure sensor. In addition, the first sensor element 141 may be provided as a single first sensor element 141 or as multiple first sensor elements 141 arrayed within the first pressurized region 130. Similarly, the second sensor element 142 may be provided as a single second sensor element 142 or as multiple second sensor elements 142 arrayed within the second pressurized region 131.

As shown in FIGS. 2 and 3, the controller 15 may be provided as an air conditioning pack controller (ACPC) and is operably coupled to the RAF 13 and the sensor 14 (i.e., one or both of the first sensor element 141 and the second sensor element 142). As such, the controller 15 is configured to drive rotations of the RAF 13 to achieve a target RAF rotational speed in accordance with a current RAF rotational speed and a reading generated by either of the first sensor element 141 and the second sensor element 142. The controller 15 includes an electric motor 150, a motor controller 151 and a pack controller 152.

The electric motor 150 may be provided as any suitable type of electric motor and is disposed at least partially on a driveshaft 154 of the RAF 13 (see FIG. 2). Thus, activation and rotation of the electric motor 150 drives corresponding rotations of the RAF 13. The motor controller 151 is operably coupled to the electric motor 150 and is configured to control operations and activations of the electric motor 150. The pack controller 152 is configured to monitor and determine the current RAF rotational speed, to register that the reading generated by the sensor 14 is indicative of an RAF surge event and to instruct the motor controller 151 to control the operation of the electric motor 150 accordingly.

In accordance with embodiments, the pack controller 152 may be component of the flight computer of the aircraft 1 or a standalone component. In either case, the pack controller 152 may include a transmission/reception (T/R) module 1520, a processing unit 1521 and a storage unit 1522. The storage unit 1522 has at least executable instructions stored thereon, which, when executed, cause the processing unit 1521 to be receptive of readings from the sensor 14 by way of the T/R module 1520, to issue instructions to the motor controller 151 by way of the T/R module 1520 and to analyze the readings and generate the instructions in accordance with the features described below.

During operation of the aircraft 1, ram air is drawn into the ram air inlet 11 and over and through the heat exchanger 12 by the RAF 13. Over time, since the ram air carries contaminants from ambient air into the heat exchanger 12, the heat exchanger 12 becomes clogged with contaminants with the result being an increased pressure drop across the heat exchanger 12. This pressure drop can lead to a low flow condition through the RAF 13 and thereby cause the RAF 13 to operate in an RAF surge condition as the controller 15 attempts to alleviate the problem of low flow by increasing the RAF rotational speed.

As shown in FIG. 4, when the controller 15 attempts to alleviate the problem of the low flow through the RAF 13, the readings generated by the sensor 14 tend to fluctuate by a relatively substantial degree. That is, as the readings of the first sensor element 141 indicate that pressures within the first pressurized region 130 are continuously dropping and/or the readings of the second sensor 142 indicate that pressures within the second pressurized region 131 are continuously dropping, the pack controller 152 will tend to instruct the motor controller 151 to cause the electric motor 150 to increase the RAF rotational speeds. This has the immediate effect of exhausting air from the pressurized region 130, which reads as a substantial pressure drop 400, and then re-pressurizing the pressurized region 130 with new ram air flows, which read as a substantial rise in pressure 401. This increased pressure reading causes the pack controller 152 to instruct the motor controller 151 to cause the electric motor 150 to decrease the RAF rotational speeds, which subsequently reads as a substantial pressure drop 402. Once again, the substantial pressure drop readings result in the pack controller 152 instructing the motor controller 151 to cause the electric motor to increase RAF rotational speeds, which again lead to a rise in pressure 403.

In accordance with embodiments, the controller 15 may be operable and configured to control the RAF 13 using a closed-loop control algorithm. Such a closed-loop control algorithm may be based on the RAF rotational speeds and not on the pressures in the first and/or second pressurized regions 130 and 131.

In any case, the processes described above has the effect of causing those pressures within the first pressurized region 130 and/or the second pressurized region 131 to fluctuate below and above a pressure threshold range that is defined by the processing unit 1521 in accordance with predefined threshold range levels and the pressures within the first pressurized region 130 and the second pressurized region 131 prior to the fluctuations. Then, after a predefined number of fluctuations in a predefined length of time (e.g., 6 fluctuations), the pack controller 152 registers that the readings generated by the first sensor element 141 and/or the second sensor element 142 are indicative of the RAF surge event being In accordance with embodiments, the predefined number of the fluctuations and the predefined length of time are both set by the pack controller 152 based on various factors including, but not limited to, current flight conditions.

With the RAF surge event in effect, the pack controller 152 sets a target RAF rotational speed at a predefined value (e.g., 7,000 RPM) and instructs the motor controller 151 to cause the electric motor 150 to drive the RAF 13 at the target RAF rotational speed. At this point, the capability of the pack controller 152 to monitor and determine the current RAF rotational speed is employed in a feedback loop whereby the instruction forwarded to the motor controller 151 by the pack controller 152 is either to slow the RAF rotational speed down if it exceeds the target RAF rotational speed or to speed up the RAF rotational speed if it is too low (i.e., the closed-loop control algorithm mentioned above). In addition, the pack controller 152 may be further configured to issue a warning to the crew, for example, by way of cockpit instrumentation that the reading generated by the sensor 14 is indicative of the surge event and/or that the surge event is in effect.

Figure 5:
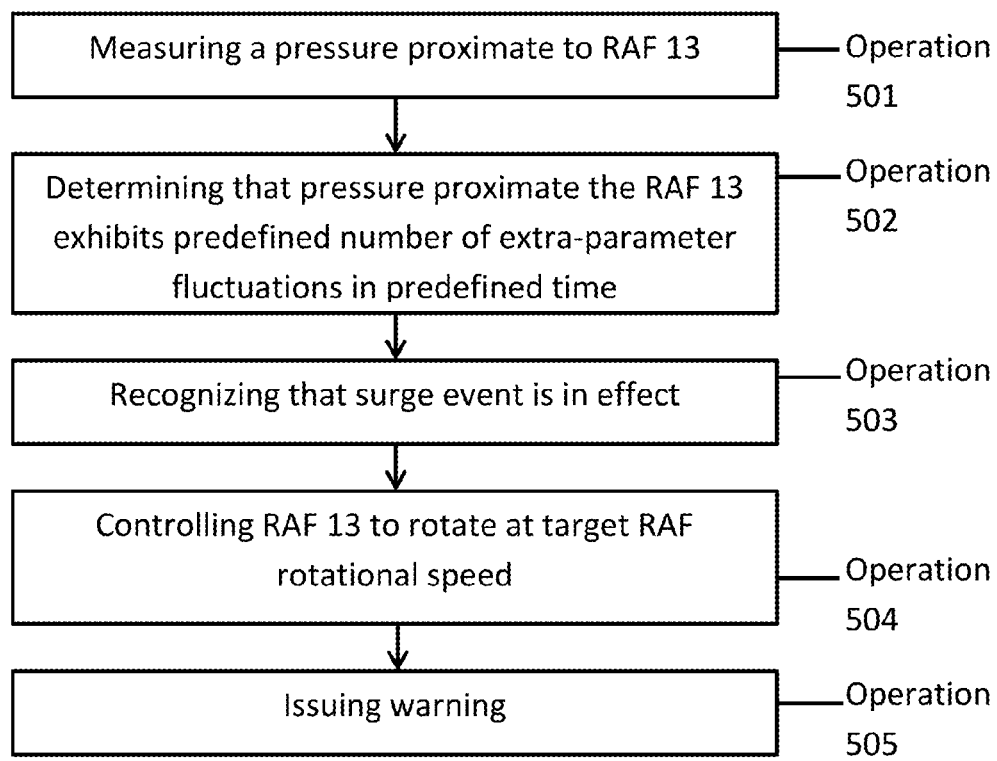
FIG. 5 is a flow diagram illustrating a method of operating a ram air fan (RAF) assembly in accordance with embodiments.

With reference to FIG. 5, a method of managing an operation of an RAF assembly 10 as described above is provided. The method includes measuring a pressure upstream from or downstream from and proximate to the RAF 13 (operation 501), determining, from the measuring, that the pressure upstream from or downstream from and proximate to the RAF 13 exhibits a predefined number of extra-parameter fluctuations in a predefined time (operation 502), recognizing that a surge event is in effect in an event that the pressure proximate to the RAF 13 exhibits the predefined number of extra-parameter fluctuations in the predefined time and controlling the RAF 13 to rotate at a target RAF rotational speed during the surge event (operation 503). In accordance with embodiments, the method may further include issuing a warning that the surge event is in effect (operation 504).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A ram air fan (RAF) assembly, comprising:
a ram air inlet;
a heat exchanger disposed in the ram air inlet;
an RAF disposed in the ram air inlet to drive airflow through the heat exchanger;
a sensor disposed in the ram air inlet proximate to the RAF; and
a controller operably coupled to the RAF and the sensor, the controller being configured to drive rotations of the RAF to achieve a target RAF rotational speed in accordance with a determination that a reading generated by the sensor is indicative of a surge event and to determine that the reading is indicative of the surge event in an event the reading comprises a predefined number of extra-parameter fluctuations in which a parameter sensed by the sensor fluctuates between minimum values below a predefined lower parameter range and maximum values above a predefined upper parameter range in a predefined time.

2. The RAF assembly according to claim 1, wherein the heat exchanger comprises a primary heat exchanger and a secondary heat exchanger in series.

3. The RAF assembly according to claim 1, wherein the RAF is downstream from the heat exchanger.

4. The RAF assembly according to claim 3, wherein the sensor is downstream from the RAF.

5. The RAF assembly according to claim 1, wherein the sensor comprises a pressure sensor.

6. The RAF assembly according to claim 1, wherein the controller comprises:
an electric motor configured to drive the rotations of the RAF;

a motor controller configured to control an operation of the electric motor; and a pack controller configured to determine a current RAF rotational speed, to register that the reading generated by the sensor is indicative of a surge event and to instruct the motor controller to control the operation of the electric motor accordingly.

7. The RAF assembly according to claim 1, wherein the target RAF rotational speed is 7,000 RPM.

8. The RAF assembly according to claim 1, wherein the controller determines that the reading is indicative of the surge event in an event the reading comprises a predefined number of high/low pressure fluctuations in which a pressure sensed by the sensor fluctuates between minimum pressure values below a predefined lower pressure range and maximum pressure values above a predefined upper pressure range in a predefined time.

9. The RAF assembly according to claim 1, wherein the controller is further configured to issue a warning that the reading generated by the sensor is indicative of the surge event.

10. A ram air fan (RAF) assembly of an aircraft, comprising:
    a ram air inlet;
    a heat exchanger disposed in the ram air inlet;
    an RAF disposed in the ram air inlet to drive airflow through the heat exchanger;
    a sensor disposed in the ram air inlet proximate to the RAF; and
    a controller operably coupled to the RAF and the sensor, the controller being configured to drive rotations of the RAF to achieve a target RAF rotational speed in accordance with a current RAF rotational speed and a reading generated by the sensor and to determine that the reading is indicative of the surge event in an event the reading comprises a predefined number of extra-parameter fluctuations in which a parameter sensed by the sensor fluctuates between minimum values below a predefined lower parameter range and maximum values above a predefined upper parameter range in a predefined time.

11. The RAF assembly according to claim 10, wherein the heat exchanger comprises a primary heat exchanger and a secondary heat exchanger in series.

12. The RAF assembly according to claim 10, wherein the RAF is downstream from the heat exchanger.

13. The RAF assembly according to claim 12, wherein the sensor is downstream from the RAF.

14. The RAF assembly according to claim 10, wherein the sensor comprises a pressure sensor.

15. The RAF assembly according to claim 10, wherein the controller comprises:
    an electric motor configured to drive the rotations of the RAF;
    a motor controller configured to control an operation of the electric motor; and
    a pack controller configured to determine the current RAF rotational speed, to register that the reading generated by the sensor is indicative of a surge event and to instruct the motor controller to control the operation of the electric motor accordingly.

16. The RAF assembly according to claim 15, wherein the target RAF rotational speed is 7,000 RPM.

17. The RAF assembly according to claim 15, wherein the pack controller registers that the reading is indicative of the surge event in an event the reading comprises a predefined number of high/low pressure fluctuations in which a pressure sensed by the sensor fluctuates between minimum pressure values below a predefined lower pressure range and maximum pressure values above a predefined upper pressure range in a predefined time.

18. The RAF assembly according to claim 15, wherein the pack controller is further configured to issue a warning that the reading generated by the sensor is indicative of the surge event.

19. A method of managing an operation of a ram air fan (RAF), the method comprising:
    measuring a pressure proximate to the RAF;
    determining, from the measuring, that the pressure proximate to the RAF exhibits a predefined number of extra-parameter fluctuations in which a parameter sensed by the sensor fluctuates between minimum values below a predefined lower parameter range and maximum values above a predefined upper parameter range in a predefined time;
    recognizing that a surge event is in effect in an event that the pressure proximate to the RAF exhibits the predefined number of extra-parameter fluctuations in the predefined time; and
    controlling the RAF to rotate at a target RAF rotational speed during the surge event.

20. The method according to claim 19, further comprising issuing a warning that the surge event is in effect.

* * * * *